H. HARTMANN.
ELASTIC TIRE FOR VEHICLES.
APPLICATION FILED FEB. 18, 1913.
1,104,797.
Patented July 28, 1914.
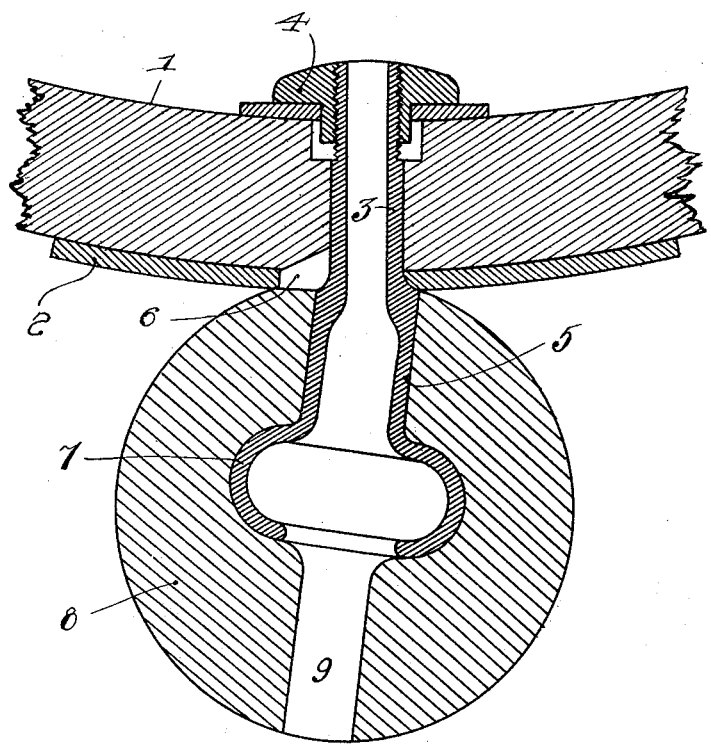

UNITED STATES PATENT OFFICE.

HEINRICH HARTMANN, OF ETTERBEEK, NEAR BRUSSELS, BELGIUM.

ELASTIC TIRE FOR VEHICLES.

1,104,797.   Specification of Letters Patent.   Patented July 28, 1914.

Application filed February 18, 1913. Serial No. 749,264.

*To all whom it may concern:*

Be it known that I, HEINRICH HARTMANN, engineer, a subject of the Duke of Saxony-Coburg-Gotha, residing at No. 21 Rue de la Confiance, Etterbeek, near Brussels, in the Kingdom of Belgium, have invented certain new and useful Improvements in Elastic Tires for Vehicles; and I do hereby declare the following to be a full, clear, and exact description of the invention, such as will enable others skilled in the art to which it appertains to make and use the same.

My invention relates to elastic tires for vehicle wheels, of the type comprising a series of circumferentially arranged resilient sections held in position upon an outer rim by means of metal or other fastening devices.

The present invention consists in an elastic tire of this type, in which each of the resilient sections is provided with a single metal fastening device which is formed with an enlarged end and is adapted to engage in a recess, which is before fixing of considerably smaller dimensions and is disposed in the central and inner portions of the tire sections formed of solid blocks of rubber, preferably of spherical shape, so that the portions of the sections surrounding the fixing device are caused to automatically grip the latter on all sides with great pressure, thereby rendering unnecessary the provision of any means for preventing lateral movement of the tire.

In the accompanying drawing:—One construction of tire according to this invention is illustrated by way of example, showing a longitudinal section of a rubber ball with the adjacent portion of the wheel felly.

As shown, 1 is a wooden felly on which is fixed an iron rim 2 without side rims or flanges. The rim and felly are pierced with equally spaced holes to receive the requisite number of rubber balls. Each ball is provided with a metal preferably hollow fixing device 3 that is attached to the rim or felly by means of a nut 4.

The outer portion 5 of each fixing device is arranged at an angle to the radius of the wheel as shown, so that as the wheel revolves, the center line of the fixing device will bear at right angles upon the ground and thus enable the ball to take its load under the most favorable conditions. For the purpose of fixing this position each fixing device is provided with a nose 6. The outer portion 5 of the fixing device terminates in a rounded enlargement 7 which engages in a correspondingly hollowed portion of the rubber ball 8 and thus holds the latter securely on the wheel felly.

The inner portion of the cavity in the rubber ball surrounding the outer portion 5 of the fixing device as well as the portion of the cavity surrounding the enlargement 7 are made sufficiently narrow to insure that the rubber shall grip the fixing device with great pressure on all sides.

9 is a hole extending through the entire outer thickness of the rubber ball; it provides in combination with the fixing device which is hollow throughout, an unobstructed passage for the flow of air through the ball during the progress of the vehicle wheel, so that a strong cooling action is thereby produced upon the rubber ball.

I claim:

1. In a vehicle tire, the combination with a felly provided with a plurality of apertures, of a rim having corresponding apertures and mounted on said felly, a member mounted in each of said apertures, said member comprising a radial portion, a circumferentially extending nose on said radial portion adapted to engage a cut out portion adjacent the aperture, an enlarged portion adjacent said radial portion forming a shoulder, an enlarged head adjacent said portion, an elastic ball provided with an axial aperture therethrough, said aperture fitting the enlarged portion and the head of said member, said member having an aperture in line with the aperture of said ball, whereby an unbroken passage is formed through said ball and said member, and means for fastening said member to said felly.

2. In a vehicle tire, the combination with a felly and a rim provided with corresponding apertures, of a member positioned in one of said apertures comprising a radial portion, a larger portion adjacent said radial portion adapted to hold a ball thereon, said ball holding portion being angularly disposed with relation to the radial portion, means for holding the angular portion in position comprising a shoulder adjacent said portion, and means for holding said member on said felly.

3. In an elastic tire, the combination with a plurality of resilient sections, of a rim, a fastening means for each of said resilient sections, said fastening means comprising angularly disposed hollow members one of said members being adapted to engage a recess in each one of the sections and the rim, an enlarged shoulder upon said hollow member adapted to engage the recess in the resilient section to expand the recess to frictionally hold the parts together, and means for fastening the members to the wheel and the rim.

4. In an elastic tire, a rim, a fastening device extending from the said rim and inclined thereto, an enlargement on the outer end of said fastening member, an elastic member provided with a relatively smaller recess therein adapted to receive the fastening device, whereby the enlargement will expand the elastic member to cause it to frictionally engage said fastening device with great pressure.

In testimony whereof I have signed my name to this specification in the presence of two subscribing witnesses.

HEINRICH HARTMANN.

Witnesses:
F. GRASSIO,
CHAS. ROY NASMITH.

Copies of this patent may be obtained for five cents each, by addressing the "Commissioner of Patents, Washington, D. C."